United States Patent [19]

Motoyama

[11] 4,270,685
[45] Jun. 2, 1981

[54] CAPSTAN BEARING DEVICE

[75] Inventor: Kazuyasu Motoyama, Hachioji, Japan

[73] Assignee: Olympus Optical Co., Ltd., Tokyo, Japan

[21] Appl. No.: 125,786

[22] Filed: Feb. 29, 1980

Related U.S. Application Data

[63] Continuation of Ser. No. 968,979, Dec. 13, 1978, abandoned.

[30] Foreign Application Priority Data

Dec. 14, 1977 [JP] Japan ................................ 52-150132
Dec. 16, 1977 [JP] Japan ................................ 52-169129

[51] Int. Cl.³ ...................... B65H 17/20; G11B 23/04
[52] U.S. Cl. ..................................... 226/194; 242/199
[58] Field of Search ............... 226/194; 242/199, 206, 242/209; 360/96.1, 96.2, 96.3, 96.4, 96.5, 96.6

[56] References Cited

U.S. PATENT DOCUMENTS

| | | | |
|---|---|---|---|
| 2,694,955 | 11/1954 | Foster | 242/71.2 |
| 3,967,769 | 7/1976 | Matsumoto | 226/194 |
| 4,025,027 | 5/1977 | Francdini | 226/194 |
| 4,067,488 | 1/1978 | Cicatelli | 226/194 |
| 4,097,006 | 6/1978 | Saito | 242/199 |

Primary Examiner—Edward J. McCarthy
Attorney, Agent, or Firm—Toren, McGeady and Stanger

[57] ABSTRACT

A capstan bearing device for a tape recorder comprises a chassis, a bearing member secured to the chassis, and a capstan shaft integrated with a flywheel, the capstan shaft having a part of the bearing member arranged to extend to the inside of a tape cassette.

1 Claim, 8 Drawing Figures

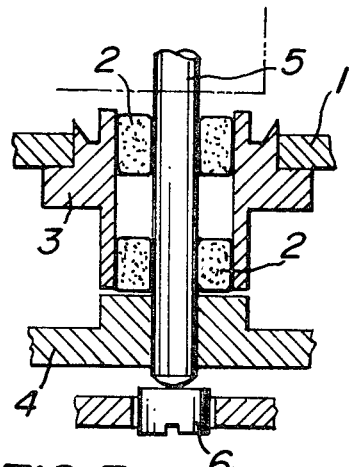
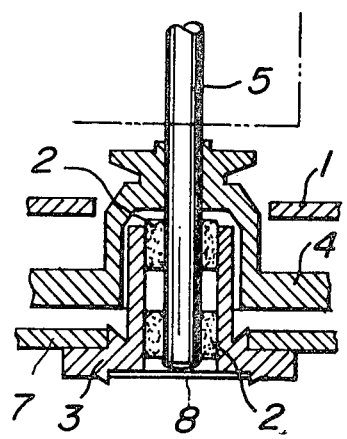
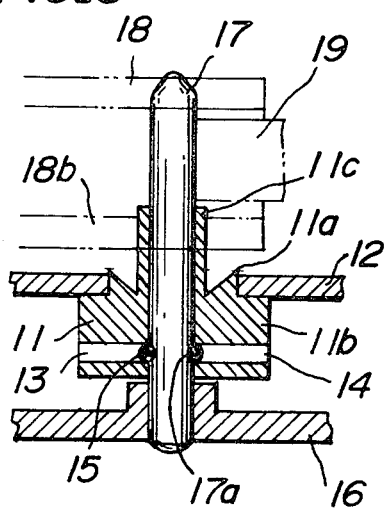
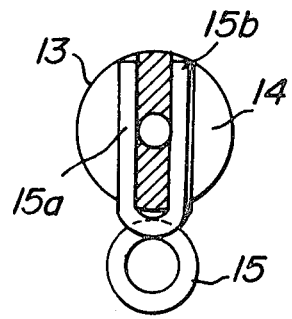
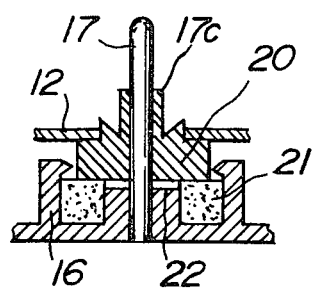
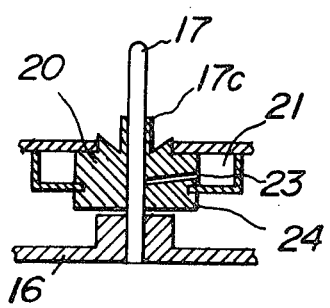

4,270,685

CAPSTAN BEARING DEVICE

This is a continuation of application Ser. No. 968,979 filed Dec. 13, 1978, abandoned.

BACKGROUND OF THE INVENTION

The present invention relates to a capstan bearing device for the purpose of making a tape recorder ultra-thin.

In a tape recorder, a capstan shaft is integrally provided with a flywheel for stabilizing rotation of the capstan shaft and for driving the capstan by a driving source through the flywheel.

In this case, as a bearing device of the capstan shaft, use is often made of an assembly formed by fixing a bearing member 3 with an oilless metal 2 to a chassis 1, inserting a capstan shaft 5 integrated with a fly-wheel 4 from the lower side or the upper side of the bearing member 3 and suitably adjusting a thrust pad by a thrust screw 6 as shown in FIG. 1 in a tape recorder with the use of a so-called compact cassette.

On the other hand, in a tape recorder which utilizes a micro cassette, there is used a bearing device wherein a bearing member 3 is fixed to a second chassis 7 and a thrust pad 8 is integrally formed with the bearing member 3 as shown in FIG. 2. To the thus formed bearing member 3 is inserted a capstan shaft 5 integrated with a flywheel 4 from the upper portion.

Since the conventional bearing device is composed of an oilless metal and a bearing member for holding the oilless metal as described above, the outer diameter of the device is liable to become enlarged. In a device using two chassis, this bearing device is an obstacle to reducing the thickness of the tape recorder.

Therefore, if a tape recorder is to be made thin, the capstan shaft cannot be shortened. Thus, if it is desired to make the bearing short, and if the bearing is made extremely short, the capstan shaft is twisted by the pressing force of a pinch roller at the time of recording or reproducing, thereby inducing an increase in the consumption of current, and deterioration of the durability of the device.

Therefore, it is proposed to extend a part of the capstan shaft into the tape cassette and this approach is utilized in the present invention. In this case, an oilless metal is generally used, and a part of a bearing 31, i.e., an extended portion 31a, is inserted into a cassette 32 as shown in FIG. 7. However, there exists the possibility of breaking that portion because the oilless metal extended into the cassette 32 is too thin. Further, since the oilless metal is exposed, there is the possibility of oil adhering to a tape when inserting or releasing a tape cassette, so that it is necessary to coat a vinyl tube on the extended portion 31a or to foam a film such as liquid teflon or the like.

SUMMARY OF THE INVENTION

An object of the present invention is to eliminate the above disadvantages of the conventional capstan bearing device.

Another object of the present invention is to provide a capstan bearing device which can make a tape recorder very thin and smoothly actuates a capstan shaft without twist.

Further object of the present invention is to provide a capstan bearing device having a simple construction, which can solve the above problems, reduces the thickness of a tape recorder considerably and prevents any damage of a tape.

According to the present invention a capstan bearing device for a tape recorder comprises a chassis, a bearing member secured to the chassis, and a capstan shaft integrated with a flywheel, the capstan shaft having a part of the bearing member arranged to extend to the inside of a tape cassette.

A part of the capstan shaft bearing is extended in the tape cassette and at least a portion extended in the cassette is made of metal material and the rest is made of an oilless metal.

BRIEF DESCRIPTION OF THE DRAWING

FIGS. 1 and 2 are cross-sectional views showing conventional bearing devices;

FIG. 3 is a cross-sectional view showing one embodiment of a capstan bearing device according to the present invention;

FIG. 4 is a cross-sectional view of the same embodiment;

FIGS. 5 and 6 are cross-sectional views showing other embodiments of capstan bearing device according to the present invention;

DESCRIPTION OF THE PREFERRED EMBODIMENT

Figure 7:
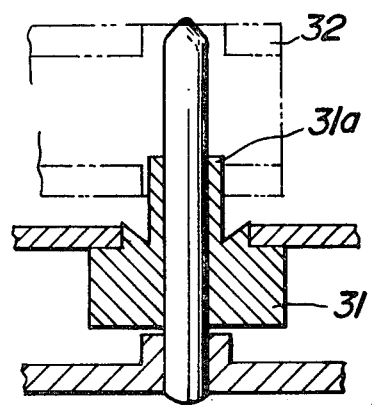
FIG. 7 is a cross-sectional view showing another conventional capstan bearing device.

Referring now to FIG. 3 one embodiment of a capstan bearing device according to the present invention will be described.

FIG. 3 is a cross-sectional view of the essential part of the bearing device according to the invention, in which a bearing 11 is formed into an annular shape from an oilless metal with an annular caulking portion 11a for securing to a chassis 12 being arranged centrally thereof. A thick bearing body portion 11b is formed below and a thin bearing extended portion 11c is formed into a cylindrical form on the upper portion.

On the other hand, at the lower portion of the bearing body 11b, as shown in cross section if FIG. 4, deep semicircular grooves 13, 14 are symmetrically bored on both sides, these grooves 13, 14 having a pair of leg portions 15a, 15b of a coupling pin 15 arranged therein in the form of a clip and engaged on opposite sides of a capstan shaft 17.

When the thus bearing 11 is tightened by the chassis 12, the bearing extended portion 11c is projected to a cassette chamber.

The capstan shaft 17 is integrated with a fly-wheel 16 and is inserted from the bottom of the bearing 11 and the capstan shaft 17 is rotatably held by the bearing 11. That is, an annular groove 17a is formed on a portion of the capstan shaft 17 adjacent the grooves 13, 14, the coupling pin 15 being brought into contact with the groove 17a, so that upper and lower thrusts of the capstan shaft 17 are received by the bearing 11.

When a part of the bearing 11 is projected to the cassette chamber together with the capstan shaft 17, the end of the bearing extended portion 11c enters into the thick portion of a lower half 18b of a cassette 18. However, the bearing extended portion 11c does not become an obstacle to contact between the capstan shaft 17 and a pinch roller 19.

With the above construction, the length from the chassis to the bearing body positioned at the lower portion becomes very short, but it takes a bearing length necessary for receiving the capstan shaft by the bearing extended portion extended to the cassette chamber. Therefore, a tape recorder can be made very thin, and the bearing length is sufficiently long, so that the capstan shaft is not twisted and is satisfactorily actuated.

In addition, a thrust can be received at the lower end of the capstan shaft, and in this case, a thrust to the upper portion can be in the same manner as a conventional one.

FIGS. 5 and 6 show other embodiments of the bearing device of the present invention. In case of formation of the bearing member with a member other than an oilless metal, a supply of oil to the bearing should be taken into consideration. In FIG. 5, there is arranged an oil-containing member 21 such as neoplane or the like between the flywheel 16 and the bearing member 20. In this case, from a gap 22 between the flywheel 16 and the bearing 20 oil is supplied to the bearing 20. In FIG. 6, there is provided an oil cup 23 around the outer periphery of the bearing member 20, the oil-containing member 21 such as a neoplane is arranged therein and oil is supplied from an supply hole 24 provided in the bearing 20. In these embodiments, the bearing extended portion is projected to the cassette chamber, so that the tape recorder can be made thin, too.

Figure 8:
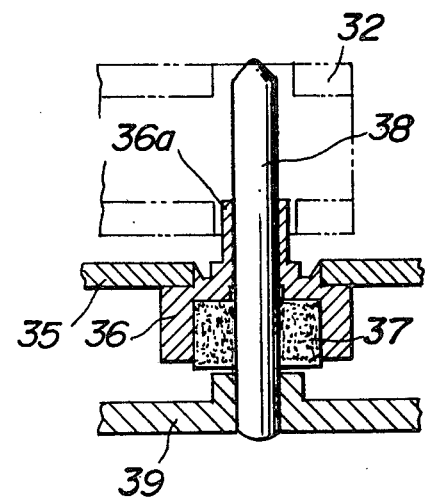
FIG. 8 is a cross-sectional view showing another embodiment of capstan bearing device according to the present invention.

Another embodiment of the present invention will be explained with reference to FIG. 8 which shows a part of a bearing device. A collar 36 made of metal such as brass or the like fixed to a chassis 35 is provided with an extended portion 36a projected to a cassette chamber for inserting a part of the coller 36, i.e., the upper side portion, into a tape cassette 32.

On the other hand, the collar 36 positioned at the lower side of the chassis 35 is made comparatively short, and into its inner diameter portion is pressurized an oilless metal 37. Thereafter, an inner diameter of the oilless metal 37, i.e., an inner diameter corresponding to a diameter of a capstan shaft 38, is formed by sizing, and in this case, an inner diameter of the extended portion 36a is also sized to form a bearing.

Thus, each inner diameter of the extended portion 36a of the collar 36 and the oiless metal 37 as a bearing for substantially receiving the capstan shaft 38 are sized to the same thickness, and then, fixed to the chassis 35 and the capstan shaft 38 having the flywheel 39 is inserted to construct a capstan bearing device.

A part of the bearing device is thus inserted into the cassette 32 for receiving the capstan shaft 38, so that even if the bearing portion arranged at the lower side of the chassis 35 is made short, there is no possibility of twisting the shaft when using the capstan shaft 38, and the bearing portion extended in the cassette 32 is a collar made of metal, so that there is no possibility of soiling a tape and the like by oil. Accordingly, a tape recorder can be made thin. Further, even if the capstan shaft is directly brought into contact with the metal collar, the oil on the oilless metal portion below is slightly permeated upwards through the capstan shaft, so that there is no possibility of damage.

As described above, according to the invention, a part of the bearing is extended to the cassette chamber in order to make the tape recorder thin, thereby designing the tape recorder into an ultrathin shape without spoiling the action of the capstan shaft, and using a single chassis which also reduces the thickness. Thus, it becomes possible to provide a capstan bearing device of a tape recorder having a simple construction.

In addition, in order to make a tape recorder considerably thinner, as a method for holding the capstan shaft in the bearing, on the peripheral surface of the capstan shaft there is bored a semi-circular groove, a support pin being inserted from this groove whereby the thrust in the upper and lower directions is received.

What is claimed is:

1. A capstan bearing device for a tape recorder adapted to operatively engage therein a tape cassette comprising a chassis, a capstan shaft having flywheel means operatively attached thereto, a bearing member secured to said chassis for rotatably supporting said capstan shaft, said bearing including an extended part thereof arranged to extend into said tape cassette in operative engagement therewith, said extended part being formed partially of metal and partially of an oilless metal, a pair of opposed grooves formed in said bearing member, an annular groove formed in said capstan shaft adjacent said opposed grooves in said bearing member, and a coupling pin extending into said opposed grooves into engagement with said annular groove in said capstan shaft to absorb axial thrust in said capstan shaft.

* * * * *